(12) United States Patent
Wakabayashi

(10) Patent No.: US 6,609,867 B2
(45) Date of Patent: Aug. 26, 2003

(54) ANTI-LOOSENING NUT ASSEMBLY

(75) Inventor: Katsuhiko Wakabayashi, Osaka (JP)

(73) Assignee: Hard Lock Industry Co., Ltd., Osaka (JP)

( * ) Notice: Subject to any disclaimer, the term of this patent is extended or adjusted under 35 U.S.C. 154(b) by 0 days.

(21) Appl. No.: 09/975,688

(22) Filed: Oct. 11, 2001

(65) Prior Publication Data

US 2002/0044849 A1 Apr. 18, 2002

(30) Foreign Application Priority Data

Oct. 18, 2000 (JP) ........................................ 2000-317755
Nov. 7, 2000 (JP) ........................................ 2000-339444

(51) Int. Cl.[7] ............................ F16B 39/12; F16B 23/00
(52) U.S. Cl. ......................... 411/238; 411/14; 411/169; 411/402; 411/919
(58) Field of Search ........................... 411/14, 169, 237, 411/238, 222, 402, 919

(56) References Cited

U.S. PATENT DOCUMENTS

| | | | | |
|---|---|---|---|---|
| 732,590 A | * | 6/1903 | Scholer | 411/238 |
| 1,212,143 A | * | 1/1917 | McGurn et al. | 411/238 |
| 1,627,745 A | * | 5/1927 | Madden | 411/238 |
| 2,301,634 A | * | 11/1942 | Nicholay | 411/238 |

* cited by examiner

*Primary Examiner*—Neill Wilson
(74) *Attorney, Agent, or Firm*—Wood, Phillips, Katz, Clark & Mortimer

(57) ABSTRACT

An anti-loosening nut assembly is composed of an upper nut 3 and a lower nut 2 that engage with each other in an eccentric manner to afford the so-called 'wedging' effect of surely inhibiting them from loosening themselves. The upper nut 3 has one or more lateral lugs to be brought into contact with the lower end of a fastening tool such as a spanner. The lug or lugs 3b protrudes or protrude from the outer peripheral portion or portions of the upper nut 3 for the purpose of visual detection of rotation angle of this nut.

10 Claims, 4 Drawing Sheets

ANTI-LOOSENING NUT ASSEMBLY

FIELD OF THE INVENTION

The present invention relates to an anti-loosening nut assembly.

BACKGROUND OF THE INVENTION

The present applicant has developed an anti-loosening nut assembly, each of them comprising a lower nut with a protrusion and an upper nut with a recess. The protrusion and the recess are shaped comple-mentarily so that the protrusion is received in the recess in such an eccentric manner as surely protecting the double-nut from any inadvertent loosening. In detail, both the lower and upper nuts have threaded bores extending therethrough, and the protrusion from the lower nut has around the threaded bore an outer periphery that is tapered to reduce its diameter towards the outer end of the lower nut. The outer periphery of said protrusion is shaped slightly eccentric with respect to the lower nut's threaded bore. On the other hand, the recess formed in the upper nut to fit on such a protrusion has an inner periphery that is formed coaxial with the upper nut's threaded bore. Thus, an eccentric relationship is provided between the protrusion and the recess. If and when those nuts are fastened to each other, they will be forced sideways a small radial distance away from the common axis of the threaded bores. Consequently, strong stresses will be imparted in opposite radial directions to a threaded rod or bolt body engaging with the threaded bores. Such a combination of strong stresses is sometimes called a 'wedging' effect of firmly retaining those nuts in position, without allowing any inadvertent loosening thereof.

Among various types of fastening tools available for use, box wrenches easy to handle for quick operations have widely been preferred. However, in case of tightening the 'upper' nut of the anti-loosening nut assembly with use of the box wrench, it has been likely to undesirably engage with the 'lower' nut that had previously and smoothly been set in position. In such an event, the upper nut would not be rotated relative to the lower nut, failing to afford the 'wedging' effect and disabling the nut assembles anti-loosening function.

It is also noted that, for ensuring the anti-loosening effect, both the lower and upper nuts of each nut assembly have to be tightened with a proper torque. Therefore, some types of torque wrenches preset to exert a prescribed torque have sometimes been used, confirming its instant level during the tightening work. However, workers would not be able to employ such a torque wrench where it could not operate smoothly. Accordingly, they would have to use any single-ended or other ordinary spanner instead of the torque wrench, being obliged to work relying on their experience and/or perception. In these cases of tightening the anti-loosening nut assemblies, the proper torque would often be unrealized, or the spanner would possibly slip down to the lower nut from the upper nut just being screwed. Joint rotation of the upper and lower nuts, or the like undesired interaction between them, will result in an unsatisfactory setting of the nut assembly.

In view of these problems, an object of the present invention is to provide an anti-loosening nut assembly whose constituent nuts can easily and surely be tightened at a proper fastening torque, even without use of any torque wrench.

DISCLOSURE OF THE INVENTION

The anti-loosening nut assembly proposed herein consists essentially of an upper nut and a lower nut, one of the nuts having around a threaded bore thereof a protrusion shaped to fit into a recess that is formed in the other nut around a threaded bore thereof. The protrusion of the one nut has an outer periphery tapered such that its diameter decreases outwards in axial direction towards the other nut. One periphery selected from the outer periphery of the protrusion and an inner periphery of the recess is formed slightly eccentric with respect to the corresponding threaded bore, with the other of the peripheries being formed coaxial with the corresponding threaded bore.

The upper nut may preferably comprise at least one lateral lug protruding sideways therefrom. The at least one lug will bear against the lower end portion (such as the lower surface or the inner peripheral end region surrounding a nut-engaging cavity) of a spanner, a box wrench or the like fastening tool when it is used to tighten the upper nut. The lateral lug or lugs may be shaped such that its or their angle of rotation can visually be detected.

In use of the nut assembly provided herein as just summarized above, the lateral lug or lugs will bear against the fastening tool when the latter tightens the upper nut. The fastening tool will be protected from any undesired interference or engagement with the lower nut, and thus can easily tighten the upper nut. As visual detection of the rotation angle of the upper nut is now so facilitated that it can be tightened exactly while checking a torque that is being applied thereto.

From another aspect, the present invention provides an anti-loosening nut assembly consisting essentially of an upper nut and a lower nut, one of the nuts having around a threaded bore thereof a protrusion shaped to fit into a recess formed in the other nut around a threaded bore thereof. The protrusion of the one nut has an outer periphery tapered such that its diameter decreases outwards in axial direction towards the other nut. One periphery selected from the outer periphery of the protrusion and an inner periphery of the recess is formed slightly eccentric with respect to the corresponding threaded bore, with the other of the peripheries being formed coaxial with the corresponding threaded bore. Characteristically, the upper nut comprises at least one lateral lug protruding sideways from a lower portion (portions) of the outer periphery so as to bear against the lower end portion of a fastening tool when it is used to tighten the upper nut.

In use of the nut assembly of the type just mentioned above, the lateral lug or lugs of the upper nut will bear against the fastening tool when the latter tightens it. The fastening tool will be protected from any undesired interference or engagement with the lower nut, and thus can easily tighten the upper nut. The lateral lug or lugs protruding from the lower peripheral portion (portions) of the upper nut does facilitate visual detection of the rotation angle of the upper nut so that it can be tightened exactly while checking a torque that is being applied thereto.

The lateral lug or lugs may protrude from the upper nut's outer and vertical surface that will be pressed on the inner surface of a spanner or the like fastening tool for tightening the upper nut. In this case, the lug is or lugs are made firmly integral with the body of the upper nut, while more easily manufacturing same. Configuration of the lug or lugs can be designed in any proper fashion, and for example it or they may form a flange extending all around the upper nut. An embossed marking, a projection or a notch may be formed in or on the circumferential flange at any proper point thereof, for the purpose of visually sensing the rotation angle.

In the present invention, the lateral lug or lugs protruding from the upper nut body will serve on one hand for control of the torque being applied thereto, and also serve on the other hand as a stopper inhibiting the fastening tool from making any excessive displacement beyond a limit in an axial direction along the nut body. Thus, in spite of such a considerable simple structure as simplifying the molds for manufacture of the nut assembly, the present invention affords visual sensing of the tightening torque as well as improvement in easiness and exactness of the fastening operation. The lateral lug or each lateral lug may be designed to have a protuberance portion jutting outwards in radial direction beyond the outer edge of each corner of the lower nut. This structure will be effective to prevent the lug or lugs from being forced into the box-shaped cavity in a box wrench, even if the latter is of the dodecagonal shape. Preferably, a distance between the axis of the upper nut and the outer tip end of each radially extending lug of this nut (viz., maximum radius of the lug or the lugs as a whole) is made equal to or greater than the maximum radius of the lower nut (viz., a distance between the axis and each of six corners, in case of a hexagonal nut). The lower nut may have a diameter equal to or greater than that of the upper nut.

Both the upper and lower nuts may be hexagonal nuts, and preferably in this case the at least one lateral lug may be formed at the lower end portion of at least one of six corners possessed by the upper nut. Such a structure will enable the lug or lugs to be mechanically processed at a location remote from the central protrusion or central recess eccentrically fitting thereon. This means that the machining of those lugs will be rendered easier and they can be formed without substantially sacrificing the rigidity of material adjacent to the protrusion or recess. By virtue of this feature, a tight and firm eccentric engagement of the protrusion with the recess will be ensured, without any fear of impairing the requisite anti-loosening effect. Further, at least one of the six corners may be left devoid of the lateral lug so that the lateral lugs formed at the other corners can serve as an apparent 'yard-stick' denoting the rotation angle but not likely to be mistaken by a fastening operator, thereby allowing him or her to visually and readily control the torque being applied to the nut. Also preferably, the lateral lug or lugs may be provided by striking upwards the upper nut corners at lower end faces thereof. The lower end portions of such corners will thus be plastically deformed outwards in radial direction. In this case, raw 'hard lock nuts' may be prepared using any proper and conventional press known in the art, before their lower ends are struck with a proper hammering machine to easily and quickly form the lateral lug or lugs. The 'hard lock nuts' finished in this way at a suppressed additional manufacturing cost will nevertheless show an excellent behavior in use and enable visual control of the fastening torque.

DETAILED DESCRIPTION OF THE INVENTION

Figure 1:
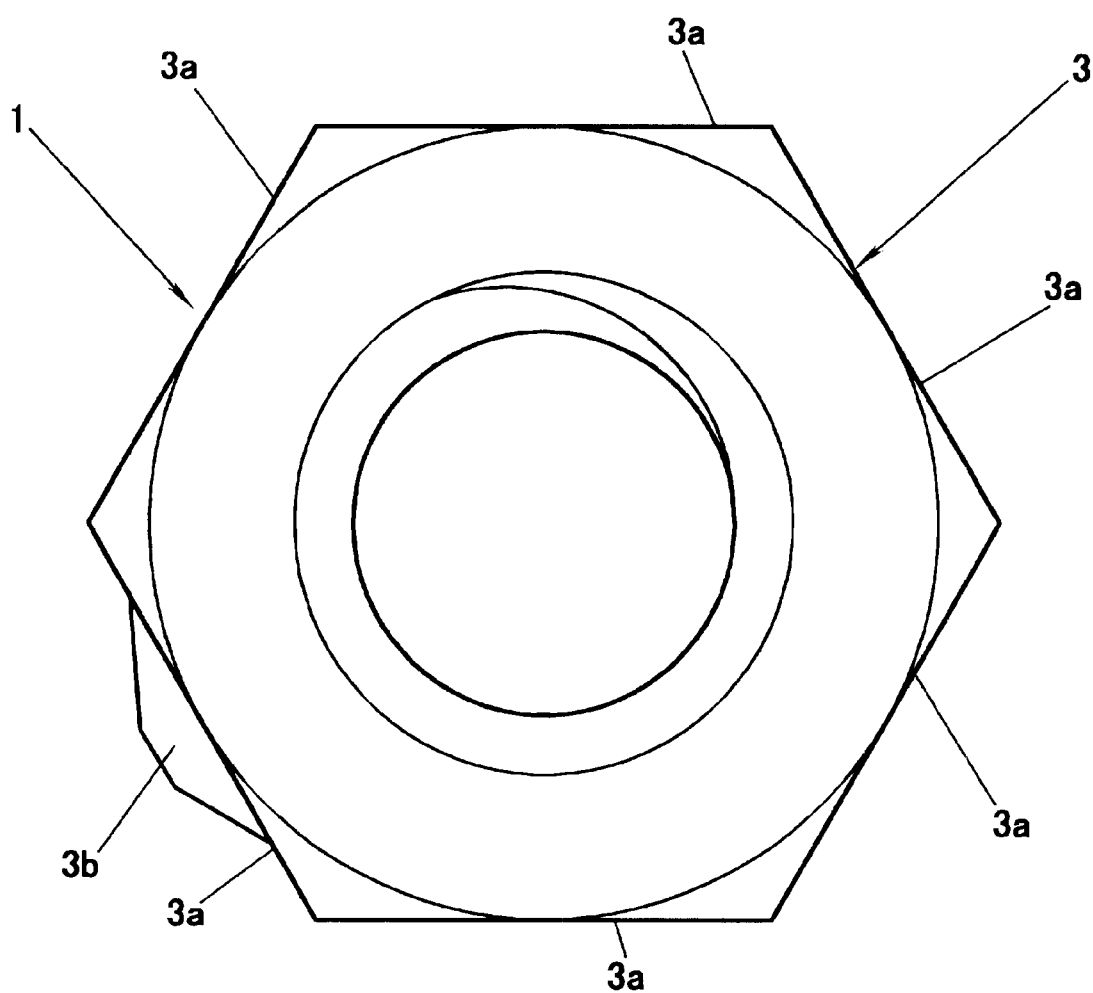
FIG. 1 is a plan view of an anti-loosening nut assembly provided in a first embodiment of the invention.
Figure 2:
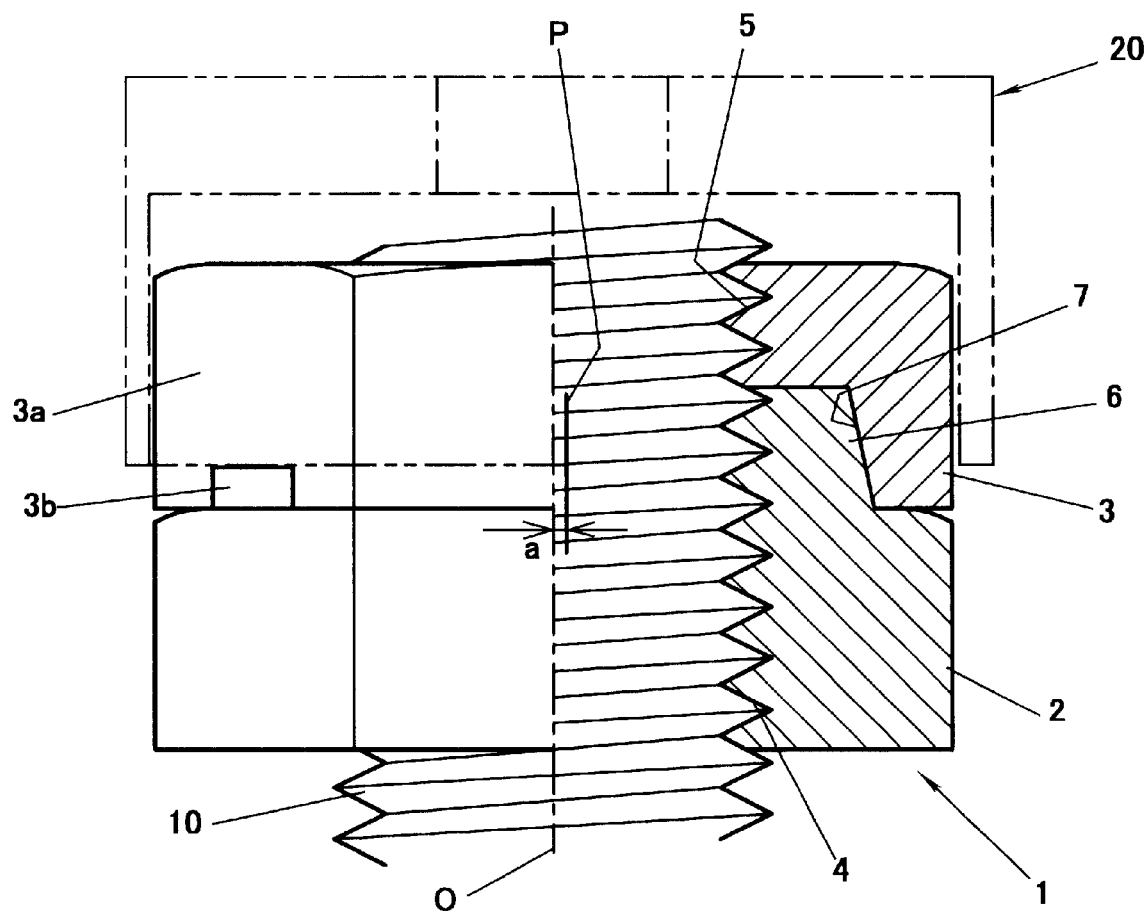
FIG. 2 is a side elevation of the nut assembly shown in FIG. 1 and partly in cross section.

In a first embodiment of the invention shown in FIGS. 1 and 2, an anti-loosening nut assembly 1 of the double-nut type consists of a lower nut 2 and an upper nut 3. These lower and upper nuts 2 and 3 may be of any shape or type, though they are shown as hexagonal nuts in the illustrated embodiment. Threaded bores 4 and 5 are formed axially of and through the respective nuts 2 and 3, respectively.

Formed integral with the lower nut 2 and around the threaded bore 4 is a protrusion 6 whose tapered outer periphery reduces diameter outwards in axial direction towards the end face of the nut. More specifically, the protrusion 6 is frustoconical, i.e., shaped like a frustum of cone. Thus the threaded bore 4 extends through both the body of nut 2 and the protrusion 6 thereof. The protrusion 6 has an outer periphery that is slightly eccentric with respect to the threaded bore 4. In the illustrated example, the frustoconical protrusion 6 is offset to the right so that its outer periphery has an axis 'P' that is disposed eccentric with respect to the axis 'O' of threaded bore 4 by a small distance 'a'.

A recess 7 formed in the upper nut 3 and around its threaded bore 5 is intended to fit on the protrusion 6 of the lower nut 2. The axis of inner periphery of this recess 7 is coaxial with the threaded bore 5 so that a slightly eccentric relationship is provided between these protrusion 6 and recess 7. The inner periphery of the recess 7 is also tapered corresponding to the shape of protrusion 6.

The upper nut 3 has vertical sides 3a (intended for engagement with a spanner or the like fastening tool 20). A lateral lug 3b protrudes from a lower portion of one of the six vertical sides 3a so as to bear against the lower end face of the fastening tool 20. The tool may be a dodecagonal or hexagonal socket of a box wrench as seen in the illustrated example. The lateral lug 3b is generally of a trapezoid or triangular shape having a summit taking an outermost position in its plan view. The lateral lug 3b is disposed generally at a middle region of the one vertical side 3a of the upper nut 3. The lateral lug 3b is made broader than each corner of the nut, so that even the end face of dodecagonal socket of the fastening tool can rest on this lug.

As shown in FIG. 2, the anti-loosening double-nut 1 of the first embodiment will be screwed on a male-threaded rod 10 to fix an article (not shown) in position. Generally speaking, the lower nut 2 of this double-nut 1 will be tightened at first on the threaded rod 10 with a predetermined torque. Subsequent to this first step, the upper nut 3 will be screwed on the same threaded rod 10, using a spanner or the like fastening tool 20 giving the predetermined torque. At this subsequent step, the tool 20 will be kept in contact with the lateral lug 3b of the upper nut 3. Thus, the fastening tool 20 is inhibited from interfering with the lower nut 2, therefore any joint rotation of the upper nut 3 and lower nut 2 which has already been tightened is prevented without fault.

The lateral lug 3b protrudes radially and outwardly from only one vertical side 3a of the upper nut 3. The tightening operation can be done while visually following the lateral lug 3b so as to easily and continuously judge rotation angle of the upper nut 3. Therefore, it can now be confirmed easily that the upper nut 3 has been tightened with the predetermined desirable torque. In detail, the upper nut 3 will be driven at first along the threaded rod until it produces a feeling of shock (corresponding to initial contact with the lower nut 2). The operator has to visually detect and memorize or record this cardinal angular position of the upper nut's lug 3b at the instant when he or she senses the feeling of shock. The operator will then use an appropriate fastening tool to further tighten the upper nut 3 until a predetermined torque is applied to this nut at a final angular position thereof. In this manner, he or she knows a 'differential angle' or distance between the cardinal angular position and the final one. Any succeeding nuts of the same type and size can now be fastened accurately to the final angular position where the predetermined torque is achieved, if the operator not using any special torque wrench does refer to and rely on the 'differential angle'.

Figure 3:
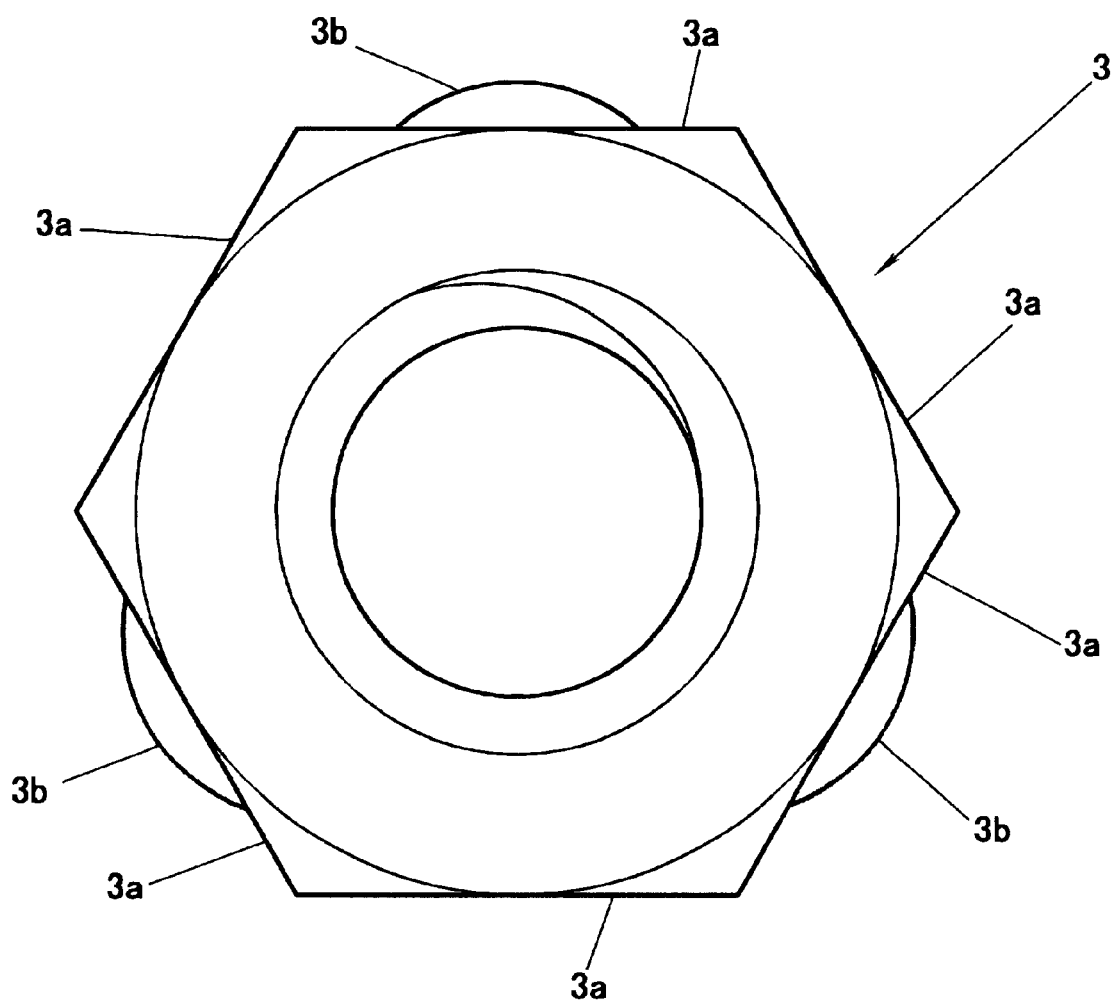
FIG. 3 is a plan view of an anti-loosening nut assembly provided in a second embodiment.

FIG. 3 shows a second embodiment of the invention. Structural elements that are the same as or similar to those which have been described above in the first embodiment will not be discussed here. In the second embodiment, three lateral lugs 3b protrude sideways from the three of six vertical sides 3a of the upper nut 3, respectively. Those three sides having the lugs intervene each between two of the other ordinary sides devoid of lateral lugs. Each lateral lug 3b in this case has an arc-shaped contour as seen in the drawings, though it may alternatively be of the same shape as in the first embodiment.

Figure 4:
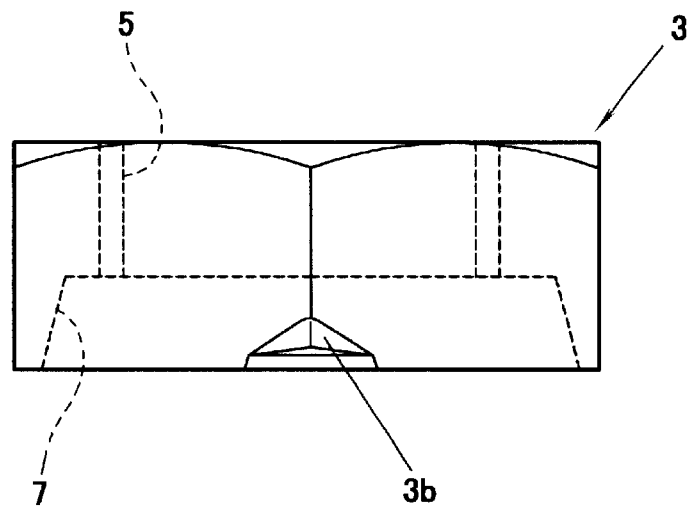
FIG. 4 is a front elevation of an upper bolt constituting an anti-loosening nut assembly in a third embodiment.
Figure 5:
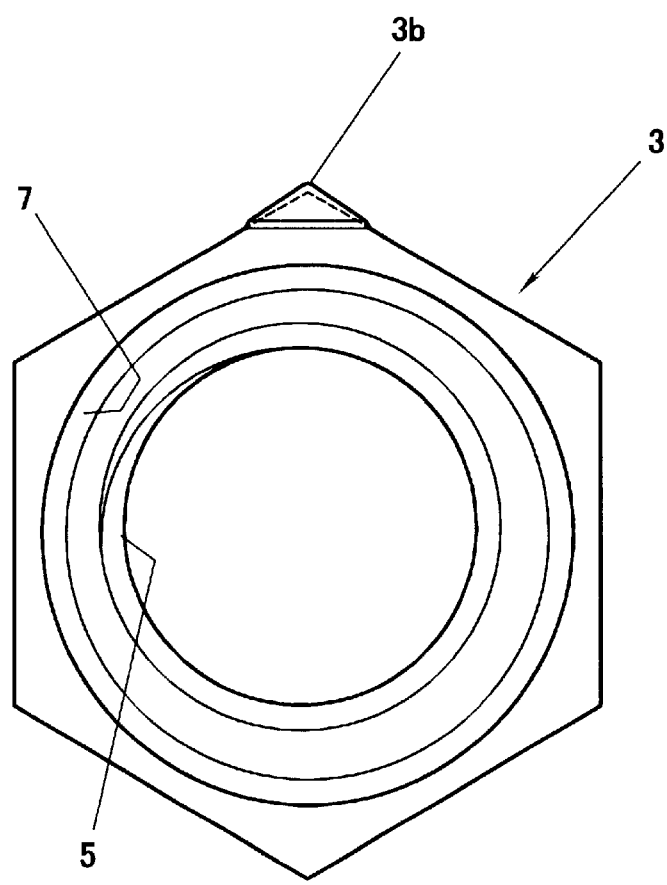
FIG. 5 is a bottom plan view of the upper bolt shown in FIG. 4.

FIGS. 4 and 5 shows only the upper nut 3 in a third embodiment, to mate a lower nut similar to that of the first embodiment. In this case, the upper and lower nuts are hexagonal nuts that are generally of the same configuration. Thus, an upward protrusion (not shown) of the lower nut is intended to fit into a recess 7 formed in the lower region of upper nut 3.

The lateral lug 3b of the upper nut 3 in the third embodiment is disposed at the lower end of only one of six corners, with the five remaining corners of said nut having no lateral lugs. To provide the lateral lug 3b, the lower end face of such one corner has been struck upwards for plastic outward deformation thereof in radial direction. Alternatively, two to five corners may have such lugs 3b, with the remaining four to one corners being left blank.

An upper nut 3 constituting the so-called existing 'hard lock nut' may have one of its corners struck or forged upwards at its lower face so as to form such a lateral lug 3b. Any of six corners of the hard lock nut provides a sufficient surface area to be struck, in spite of existence of the recess 7, thus diminishing errors during the manufacturing process and raising efficiency thereof.

The present invention is not delimited to the embodiments described above, but they can be modified in any suitable manner within the technical concept disclosed in this text. For example, overall configuration of the lower and upper nuts 2 and 3 is a matter of design choice. They may not necessarily be of a hexagonal shape but be of an octagonal or any other polygonal shape (viz., substantially equilateral polygon in plan view), or may be round nuts.

Each lateral lug 3b is preferably disposed on any lateral side 3a as in the preceding embodiments, although it may alternatively protrude from a lateral summit (viz., a junction of neighboring vertical sides 3a) of the upper nut 3.

In summary, in use of the nut assembly of the invention, a fastening tool will come into contact with the lateral lug of the upper nut so as not to interfere with the lower nut and to thereby facilitate the tightening of said upper nut. Operators tightening such nut assemblies can visually sense the rotation angle of upper nuts so as to easily and surely realize a desirable standard torque that has to be imparted to them at their final angular position.

What is claimed is:

1. An anti-loosening nut assembly comprising an upper nut and a lower nut, one of the nuts having around a threaded bore thereof a protrusion shaped to fit into a recess that is formed in the other nut around a threaded bore thereof, the protrusion of the one nut having an outer periphery tapered such that its diameter decreases outwards in axial direction towards the other nut, and one of the outer periphery of the protrusion and an inner periphery of the recess being formed slightly eccentric with respect to the corresponding threaded bore, with the other of the peripheries being formed coaxial with the corresponding threaded bore, wherein the upper nut comprises at least one lateral lug that protrudes sideways therefrom so as to bear against a lower end portion of a fastening tool such as a box wrench and thereby limit axial movement of a fastening tool such as a box wrench.

2. An anti-loosening nut assembly as defined in claim 1, wherein the at least one lug protrudes from a vertical surface of the nut, with the vertical surface engagable on an inner surface of a fastening tool such as a box wrench.

3. An anti-loosening nut assembly as defined in claim 1, wherein the at least one lateral lug is shaped so as to enable visual detection of the rotation angle.

4. An anti-loosening nut assembly according to claim 1 wherein the at least one lateral lug limits axial movement of a fastening tool such as a box wrench so that a fastening tool such as a box wrench engaged with the upper nut and bearing against the at least one lateral lug cannot be moved further axially to engage the lower nut so as to allow turning thereof.

5. An anti-loosening nut assembly comprising an upper nut and a lower nut, one of the nuts having around a threaded bore thereof a protrusion shaped to fit into a recess that is formed in the other nut around a threaded bore thereof, the protrusion of the one nut having an outer periphery tapered such that its diameter decreases outwards in axial direction towards the other nut, and one of the outer periphery of the protrusion and an inner periphery of the recess being formed slightly eccentric with respect to the corresponding threaded bore, with the other of the peripheries being formed coaxial with the corresponding threaded bore, wherein the upper nut comprises at least one lateral lug that protrudes sideways therefrom so as to bear against a lower end portion of a fastening tool such as a box wrench, and is shaped such as enabling visual detection of its rotation angle, wherein both the upper and lower nuts are hexagonal nuts, and the at least one lateral lug is disposed at a lower end region of at least one of six vertical corners of the upper unit, with at least one of other remaining corners being left blank.

6. An anti-loosening nut assembly as defined in claim 5, wherein the at least one lateral lug is formed by striking the lower end portion upwards to make an outward plastic deformation in radial direction.

7. An anti-loosening nut assembly comprising an upper nut and a lower nut, one of the nuts having around a threaded bore thereof a protrusion shaped to fit into a recess that is formed in the other nut around a threaded bore thereof, the protrusion of the one nut having an outer periphery tapered such that its diameter decreases outwards in axial direction towards the other nut, and one of the outer periphery of the protrusion or an inner periphery of the recess being formed slightly eccentric with respect to the corresponding threaded bore, with the other of the peripheries being formed coaxial with the corresponding threaded bore, wherein the upper nut comprises at least one lateral lug that protrudes sideways from at least one discrete outer peripheral portion of the upper nut so as to bear against a lower end portion of a fastening tool such as a box wrench and thereby limit axial movement of a fastening tool such as a box wrench.

8. An anti-loosening nut assembly as defined in claim 7, wherein the at least one lug protrudes from a vertical surface of the nut, with the vertical surface engagable on an inner surface of a fastening tool such as a box wrench.

9. An anti-loosening nut assembly comprising an upper nut and a lower nut, one of the nuts having around a threaded bore thereof a protrusion shaped to fit into a recess that is formed in the other nut around a threaded bore thereof, the protrusion of the one nut having an outer periphery tapered such that its diameter decreases outwards in axial direction towards the other nut, and one of the outer periphery of the protrusion or an inner periphery of the recess being formed slightly eccentric with respect to the corresponding threaded bore, with the other of the peripheries being formed coaxial with the corresponding threaded bore, wherein the upper nut comprises at least one lateral lug that protrudes sideways from at least one discrete outer peripheral portion of the upper nut so as to bear against a lower end portion of a fastening tool such as a box wrench, wherein both the upper and lower nuts are hexagonal nuts, and the at least one lateral lug is disposed at a lower end region of at least one of six vertical corners of the upper unit, with at least one of other remaining corners being left blank.

10. An anti-loosening nut assembly as defined in claim 9, wherein the at least one lateral lug is formed by striking the lower end portion upwards to make an outward plastic deformation in radial direction.

* * * * *